Feb. 15, 1944.  T. C. SCHENK  2,342,062
DEVICE FOR PRODUCING POTABLE WATER FROM SEA WATER
Filed May 12, 1943
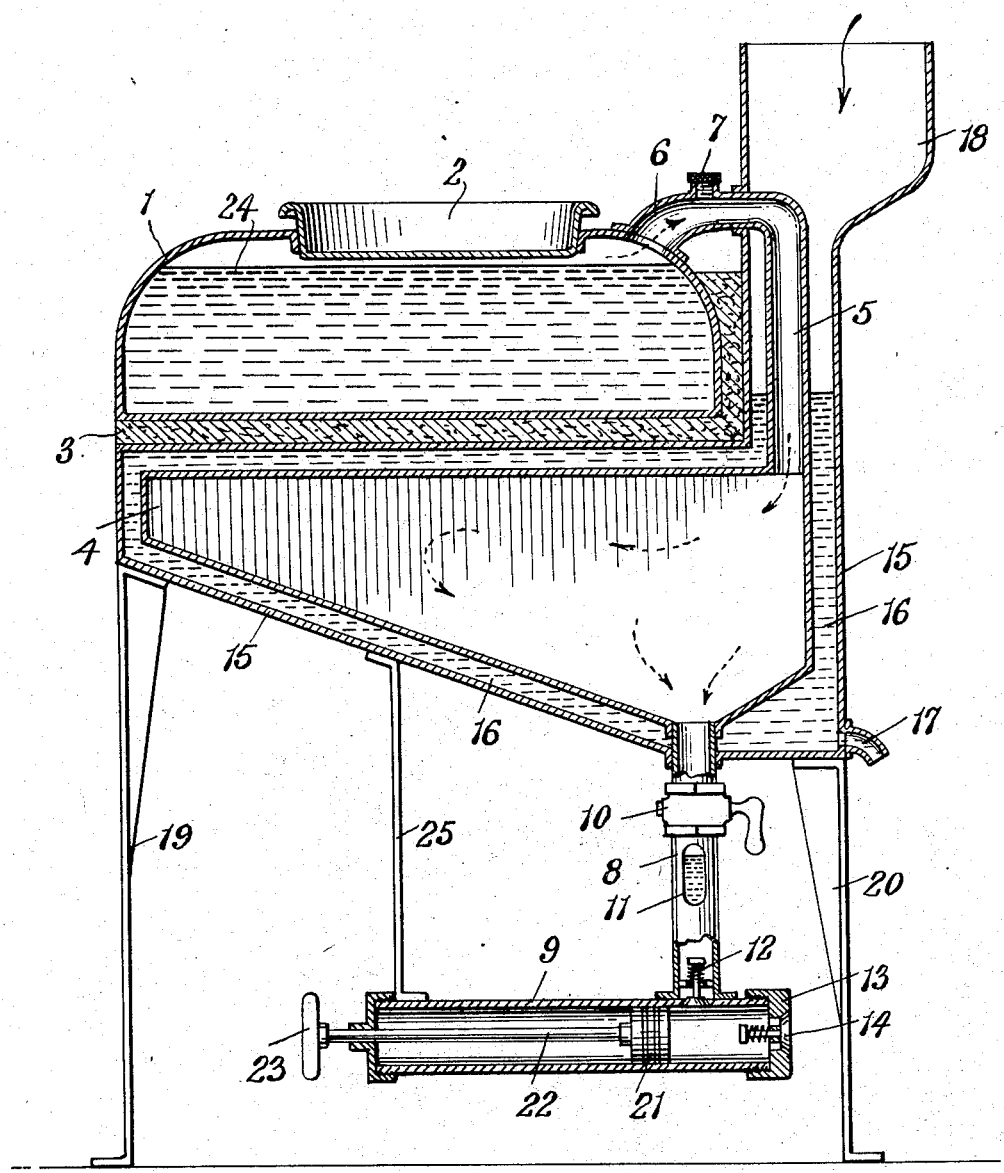
INVENTOR.
*Tamis C. Schenk*
BY
*Harry Radzinsky*
ATTORNEY Patented Feb. 15, 1944

2,342,062

UNITED STATES PATENT OFFICE 2,342,062

DEVICE FOR PRODUCING POTABLE WATER FROM SEA WATER

Tamis C. Schenk, Richmond Hill, N. Y.

Application May 12, 1943, Serial No. 486,718

2 Claims. (Cl. 202—205)

This invention relates to a device for rendering sea water or other normally non-potable water, fit for drinking purposes. It relates to a device by which condensation is secured by boiling the sea water and cooling the vapor.

An object of the invention is to provide a compact, easily portable device requiring nothing more than the sea water and the rays of the sun to procure the desired result. As is well known, the greatest hardship which the ship-wrecked are compelled to endure is a combination of lack of drinking water and the intense heat of the sun. The need for a simple, easily-operated device, which can be readily included as standard equipment of a life boat or raft, and which can convert the sea water to a potable water, using only the heat of the sun and the water of the sea, plus very slight manual effort, is indeed great. Therefore, the present invention contemplates such a device by which the sea water can be vaporized and the vapor condensed into potable water readily and conveniently, the only requirement being that sea water and sunshine be available. Most persons who have been through shipwreck have complained that there usually is entirely too much of both.

In the accompanying drawing, wherein an illustrative embodiment of the invention is disclosed, the figure is a vertical sectional view through the improved device.

Briefly, the invention contemplates the provision of a container or boiler which is filled with sea water and which is placed to receive the direct rays of the sun, causing the water in the chamber, and in which air pressure has been considerably reduced, to vaporize and flow into a vaporizing and condensing chamber, the latter chamber being jacketed so that a cooling flow of manually-poured sea water may be caused to pass around it to cause the vapor in the vaporizing chamber to condense into water and collect in the vaporizing chamber from which it may be removed for drinking purposes.

In the drawing, the water container or boiler is shown at 1, the same constituting a vacuum boiler and being shaped to best allow a considerable portion of its surface to be accessible to the strong rays of the sun. In fact, the container 1 may, if desired, be provided with fins or other extensions tending to increase the surface available to the sun. The container 1 is provided with a filler opening which is normally closed by the tight-fitting cover 2 of relatively large diameter to permit entry of the hand to facilitate cleaning out of the container. The container and its cover are preferably blackened for heat absorption, and the bottom of the container is insulated, as indicated at 3, to prevent heat loss.

Located under the container 1 is a vaporizing and condensing chamber 4, connected at the top to the pipe 5, which connects at 6 to the container 1. A threaded vent plug 7 is provided in the pipe 5.

The bottom of the chamber 4 connects to the upper end of an outlet pipe 8 which has its lower end connected to the barrel of the hand-operated suction pump 9, said pump being also supported by one or more braces 25. Located in the pipe 8, between the chamber 4 and the pump 9 is a petcock 10. Below the petcock is provided a glass-covered peep-hole 11, and between the pump and the pipe 8 is located the check-valve 12. The end of the pump 9 is provided with a cap 13 in which a check-valve 14 is situated.

Surrounding the chamber 4 is a water-jacket 15, providing a space 16 between it and the walls of the chamber 4 through which a flow of manually poured cooling sea water is had. To facilitate the rapid pouring of water into the space 16, a funnelled top 18 is provided. At the lower end of the jacket 15 is located an outlet of relatively small size to retard the outflow of the water 16, enabling the space to be kept filled with little manual effort, and causing a slow outflow of the water.

The entire device may be supported on suitable legs 19 and 20 and the pump may be conveniently located to enable it to be easily manually operated. The pump piston is of relatively small size, said piston 21 being connected to the rod 22, terminating in the handle 23.

Briefly, the operation of the device is as follows:

The container or boiler 1 is filled with sea water 24 and then tilted so that the water will pass through the pipe 5 and flow down into the chamber 4, thus insuring complete filling of the chamber and container 1. When both chamber 4 and the container 1 are completely filled, a small amount of the water should be spilled out, leaving the level of the water just below the cover 2. The cover 2 is then put in place and the petcock 10 is opened. The pump is then operated to remove all water from chamber 4 and pipe 5, the water flowing through check valve 12 and being forced out through check valve 14 by the action of the pump. By glancing through the peep hole 11 it can be ascertained when the chamber 4 has been emptied of water. When this has been done, the valve 10 is closed. The air pressure in the chamber 4 is very low, and the strong rays of the sun, coupled with the fact that tropical sea water is usually of high temperature, will soon cause the water in container 1 to boil. The vapor will flow through pipe 5 and into the chamber 4. While this is taking place, a constant flow of cooling water is poured through funnel 18 and into the space 16, this cooling water being sea water manually poured through the funnel and slowly emptying from outlet 17. The cooling water is poured continuously while the device is in operation and since it surrounds the vapor-filled chamber 4 it will cause the vapor therein to condense and collect in the chamber 4. This condensation, being potable, can be drawn out of the chamber 4 by operation of the pump 9. When most of the water 24 in the container 1 has boiled off, the vent plug 7 can be removed to allow air to again enter the system. The cover 2 can then be removed and the remainder of the sea water in the container 1 and salt and other accumulations removed. The device is then refilled as described and the operations repeated.

It will be obvious that various changes may be readily made in the structure and mode of operation without departing from the spirit of the invention, since the size, shape and arrangement of the parts of the structure may be varied according to the requirements of portability, weight and stowage. Since the operation of the device requires only the sea water to be distilled in the manner herein described, and strong sun to boil the sea water, which elements are present in the tropics where the demand for drinking water is greatest, no problem to secure satisfactory operation of the device is contemplated.

What I claim is:

1. A portable water distilling device for converting sea water to potable water comprising, a chamber for holding a quantity of sea water while said chamber is subjected to the rays of the sun, a condensing chamber situated closely adjacent to and connected with said water chamber, a manually operated pump connected to the condensing chamber for reducing the air pressure therein and in the water chamber and for drawing distilled water from the condensing chamber, a jacket disposed around the condensing chamber and forming an enclosure between it and said chamber, said enclosure having an upper filler opening and a lower outlet, whereby a continuous flow of cooling water may be poured through the filler opening to extend around and cool the condensing chamber and will flow out of the lower outlet by gravity.

2. A portable water distilling device for converting sea water to potable water comprising, a chamber for holding a quantity of sea water while said chamber is subjected to the rays of the sun, a condensing chamber situated below and closely adjacent to and connected with said water chamber, said condensing chamber being provided with a drain outlet, a manually operated pump situated in said outlet and connected to the condensing chamber for reducing the air pressure therein and in the water chamber and for drawing distilled water from the condensing chamber out through the outlet thereof, an enclosure extending around and enclosing the condensing chamber and spaced therefrom to provide a cooling compartment between it and the condensing chamber, a filler opening at the top of the compartment through which sea water may be manually poured to flow around the condensing chamber to condense the vapor therein.

TAMIS C. SCHENK.